United States Patent [19]
Schoop et al.

[11] Patent Number: 4,735,304
[45] Date of Patent: Apr. 5, 1988

[54] SCRAPER-CHAIN CONVEYOR CHANNEL SECTION

[75] Inventors: Gunther-Dietmar Schoop, Ottmarsbocholt; Franz Roling, Nordkirchen; Bernd Steinkuhl; Manfred Redder, both of Lünen, all of Fed. Rep. of Germany

[73] Assignee: Gewerkschaft Eisenhutte Westfalia GmbH, Lünen, Fed. Rep. of Germany

[21] Appl. No.: 885,823

[22] Filed: Jul. 14, 1986

[30] Foreign Application Priority Data

Jul. 27, 1985 [DE] Fed. Rep. of Germany ....... 3526786
Apr. 22, 1986 [DE] Fed. Rep. of Germany ....... 3613551

[51] Int. Cl.⁴ ............................................. B65G 19/28
[52] U.S. Cl. .................................................. 198/735
[58] Field of Search ........................... 198/735, 860.3

[56] References Cited

U.S. PATENT DOCUMENTS

| 3,774,751 | 11/1973 | Bakker | 198/735 |
| 4,282,968 | 8/1981 | Temme | 198/735 |
| 4,359,154 | 11/1982 | Temme | 198/735 |
| 4,667,811 | 5/1987 | Shoop et al. | 198/735 |

FOREIGN PATENT DOCUMENTS

| 109221 | 11/1927 | Austria | 198/735 |
| 922754 | 12/1954 | Fed. Rep. of Germany | 198/735 |
| 1073386 | 1/1960 | Fed. Rep. of Germany | 198/735 |
| 1301994 | 9/1969 | Fed. Rep. of Germany | 198/735 |
| 2095195 | 9/1982 | United Kingdom | 198/735 |

Primary Examiner—Stephen J. Novosad
Assistant Examiner—John F. Letchford
Attorney, Agent, or Firm—Samuels, Gauthier, Stevens & Kehoe

[57] ABSTRACT

A scraper-chain conveyor channel section comprises a return trough and a conveyor trough. The return trough is constituted by a pair of side walls interconnected by a floor plate. A respective support bar is fixed to each of the side walls of the return trough. The support bars have portions extending upwardly beyond the side walls of the return trough. The conveyor trough is arranged between the upwardly-extending portions of the support bars. The conveyor trough is constituted by a pair of side walls interconnected by a floor plate. Respective connection means are provided for connecting the conveyor trough to each of the support bars. Each of the connection means includes a plurality of bolts and a plurality of clamping members. Each of the bolts is seated in a respective pocket in the associated support bar, and is engageable with a respective clamping member to force that clamping member into engagement with a respective clamping face on the conveyor trough.

26 Claims, 3 Drawing Sheets

SCRAPER-CHAIN CONVEYOR CHANNEL SECTION

BACKGROUND TO THE INVENTION

This invention relates to a scraper-chain conveyor channel section.

Scraper-chain conveyors, which are constituted by a plurality of individual channel sections (pans) joined together end-to-end, are used for preference in mine workings. The channel pans consist, in general, of two generally sigma-shaped rolled side sections and a floor plate welded in between the side sections at their centers.

It is known to form a scraper-chain conveyor in two parts, namely by a conveyor trough and a return trough, each trough having side walls interconnected by a floor plate. The conveyor trough of such a conveyor is arranged between upwardly extending support bars fixed to the side walls of the return trough, and is detachably connected to the support bars by means of vertical bolts seated in bolt pockets provided in the support bars. The bolts pass through holes in connection pieces fixed to the side walls of the conveyor trough, and nuts threaded on to the bolts make the conveyor trough fast in relation to the return trough. The conveyor trough, which in use is subject to wear, being detachably connected to the return trough, is easily replaceable. In one known channel section of this type, the conveyor trough is provided with outwardly-directed fittings which engage in upwardly-open pockets formed in the support bars, the fittings being made fast in the pockets by means of vertical bolts. (See DE-OS 3 335 057). The fittings are U-shaped connection pieces welded externally to the side walls of the conveyor trough. The bolts engage through these connection pieces, with their heads held in bolt pockets provided in the support bars or in special insert pieces which are welded into aperatures in the support bars. While such bolt connections enable the conveyor trough to be braced firmly against the return trough, under some circumstances the fitting of the conveyor trough does cause certain problems, since the conveyor trough must be lifted and then lowered, with precise orientation, so that the previously-inserted bolts enter the bolt holes in the connection pieces. If precise alignment is not achieved, therefore, damage can occur to the bolts during these manipulations.

The aim of the invention is to provide a scraper-chain conveyor channel section having a detachable conveyor trough which is such that the conveyor trough can be reliably and firmly fixed to the return trough, and which is such that the fitting and dismantling of the conveyor trough is facilitated.

SUMMARY OF THE INVENTION

The present invention provides a scraper-chain conveyor channel section comprising a return trough constituted by a pair of side walls interconnected by a floor plate, a respective support bar fixed to each of the side walls of the return trough, the support bars having portions extending upwardly beyond the side walls of the return trough, a conveyor trough arranged between the upwardly-extending portions of the support bars, the conveyor trough being constituted by a pair of side walls interconnected by a floor plate, and respective connection means for connecting the conveyor trough to each of the support bars, each of the connection means including a plurality of connectors and a plurality of clamping members, each of the connectors being seated in a respective pocket in the associated support bar and being engageable with a respective clamping member to force that clamping member into engagement with a respective clamping face on the conveyor trough.

Advantageously, each of the connectors is constituted by a nut and bolt, the bolts being seated in pockets in the support bars and passing through apertures in the clamping members, and the nuts being engageable with the bolts to force the clamping members into engagement with the clamping faces.

Thus, the clamping members, which are separate from the conveyor trough, are used to transmit the clamping forces of the bolts to the conveyor trough, in that they engage clamping faces on the side walls of the conveyor trough, and are braced against these clamping faces by the bolts. In this way, it is possible to achieve a reliable and powerful connection of the conveyor trough to the return trough. At the same time, simplifications in fitting occur, since the clamping members can be inserted and attached only after the conveyor trough has been positioned on the return trough.

It is further advantageous that, by way of the clamping members, the clamping forces can be brought into effect directly on the side walls of the conveyor trough, and can be transmitted by the shortest way to the return trough. It is especially advantageous, in this respect, if the clamping members are provided with claws which engage in grooves formed in the side walls of the conveyor trough, the bases of the grooves constituting the clamping faces. Preferably, the grooves are milled recesses formed in the side walls of the conveyor trough, and the grooves are open towards the upper sides of the side walls of the conveyor trough. This permits the clamping members to be inserted and released even if lateral attachments, such for example as winning machine guides, are attached to the support bars or to the return trough. The clamping members may each have one or two claws, and the side walls of the conveyor trough are correspondingly provided with one or two grooves or milled recesses at each locking position.

Advantageously, each clamping member is seated in a recess formed in the associated support bar, and each of said recesses is shaped to conform with the outline form of the associated clamping member. Preferably, the underneath of each clamping member is provided with alignment extension members which engage in correspondingly-shaped depressions formed in said recesses. Conveniently, each clamping member is provided with a laterally and upwardly open recess for receiving the nuts of the associated connector.

In a preferred embodiment, each pocket has an L-shaped lead-in aperture for directing the associated bolt into its seated position, said aperture being open towards the inner side of the associated support bar. In this case, the bolts are inserted, from the inside, into the pockets in the support bars before the conveyor trough is positioned on the return trough. Advantageously, the pockets are provided in insert pieces which are welded into recesses in the support bars, the insert pieces supporting the clamping members.

Preferably, each support bar is provided with a support face arranged beneath the associated side wall of the conveyor trough, whereby the side walls of the conveyor can be braced against said support faces with the aid of the connectors and the clamping members. Conveniently, each side wall of the conveyor trough includes a web portion which is inwardly inclined towards the floor plate of the conveyor trough, the web portions defining hollows in the side walls of the conveyor trough, and wherein bearing pieces are fixed to said web portions, the bearing pieces supporting the conveyor trough on the support faces of the support bars.

In a preferred embodiment, the bearing pieces support the conveyor trough on the support faces of the support bars with a clearance between the side walls and the floor plates of the return trough and of the conveyor trough.

Advantageously, the bearing pieces constitute alignment means for aligning the conveyor trough in the longitudinal direction on the return trough. Preferably, the support bars engage in the hollows in the side walls of the conveyor trough, the support bars being provided with alignment stops for the bearing pieces.

In a preferred embodiment, each bearing piece is provided with sliding faces rising arcuately from the face thereof which rests on the support face of the associated support bar. This feature facilitates dismantlement, in that is it only necessary to slacken and remove the bolts and the clamping members at one channel side, whereupon the conveyor trough (possibly with slackening of the bolts situated on the opposite channel side) can be lifted away from the return trough.

The invention further provides a scraper-chain conveyor channel section comprising a return trough constituted by a pair of side walls interconnected by a floor plate, a respective support bar fixed to each of the side walls of the return trough, the support bars having portions extending upwardly beyond the side walls of the return trough, a conveyor trough arranged between the upwardly-extending portions of the support bars and supported on support faces of the support bars, the conveyor trough being constituted by a pair of side walls interconnected by a floor plate, and respective connection means for connecting the conveyor trough to each of the support bars, each side wall of the conveyor trough including a web portion which is inclined towards, and fixed to, the floor plate of the conveyor trough the web portions defining hollows in the side walls of the conveyor trough, wherein bearing pieces are fixed to the web portions within the hollows, the bearing pieces supporting the conveyor trough on the support faces of the support bars with a clearance between the side walls and the floor plates of the return trough and of the conveyor trough.

In this case, the bearing pieces are welded into the hollows, and the bearing pieces bear upon the support faces of the support bars. The support faces of the bearing pieces end in arcuate, upwardly-extending sliding faces; while, above the bearing pieces on the support bars there are provided, as securing elements, releasable connection means which brace the bearing pieces against the support faces. These connection means may advantageously be constituted by the above-mentioned connectors and clamping members provided with claws engaging in grooves formed in the side walls of the conveyor trough. Alternatively, however, locking and clamping elements of other kinds can also be used, for example locking elements braceable by a wedge action or locking elements consisting of wedges. The primary essential is that defined support positions are formed on the conveyor trough by the bearing pieces lying in a concealed manner in the hollows of the conveyor trough, these support positions being so arranged that the clamping forces are transmitted by the shortest way to the return trough.

BRIEF DESCRIPTION OF THE DRAWINGS

Two forms of conveyor channel section, each of which is constructed in accordance with the invention, will now be described, by way of example, with reference to the accompanying drawings, in which.

DESCRIPTION OF PREFERRED EMBODIMENTS

Figure 1:
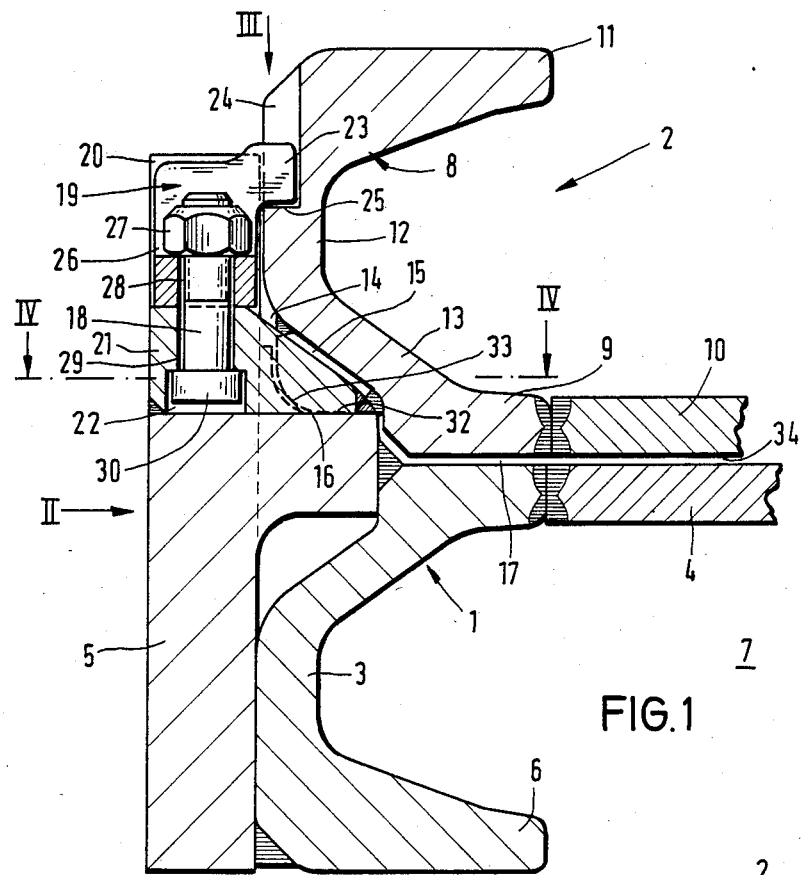
FIG. 1 is a sectional end view of part of the first form of conveyor channel section.

Referring to the drawings, FIGS. 1 to 4 show a scraper-chain conveyor channel section having a lower component (return trough) 1 and an upper component (conveyor trough) 2. The conveyor trough 2 rests on the return trough 1, and can be detachably connected thereto for easy replaceability. The components 1 and 2 define upper and lower guide passages for the upper (conveying) and lower (return) runs of a scraper-chain assembly (not shown). The channel section is symmetrical about its vertical longitudinal central plane, and so only one side portion of the channel is shown and described.

The return trough 1 is constituted by two similar U-shaped rolled bars 3 having upper and lower inwardly-projecting flanges, the bars extending the entire length of the channel section. A floor plate 4 is welded between the upper flanges of the bars 3. Support bars 5 are welded to the external surfaces of the bars 3, the support bars 5 extending upwardly beyond the floor plate 4. The support bars 5 are provided with several vertically-spaced rows of apertures forming pockets into which the heads of threaded bolts (which serve for the fastening of attachments) can be pushed. The lower flanges 6 of the two bars 3 can be connected by a welded-in cover plate (not shown) which closes off the base of the return run 7 of the scraper-chain assembly.

The conveyor trough 2 is also constituted by two U-shaped rolled bars 8, which can correspond to the bars 3 of the return trough 1. The bars 8 have lower flanges 9 and upper flanges 11, the lower flanges being connected by a welded-in floor plate 10.

The web section connecting the lower flange 9 of each bar 8 to the upper flange 11 consists of an upper vertical web part 12 and a lower, obliquely-inclined web part 13. The web part 13 is inclined inwards towards the floor plate 10, and defines a recess 14 on the outside of the bar 8. Bearing pieces 15 are welded into the recesses 14, the bearing pieces being effective to support the conveyor trough 2 on horizontal support faces 16 of the support bars 5, the horizontal support faces being provided on extension pieces engaging in the recesses. The arrangement is such that, when the conveyor trough 2 is supported on the return trough 1, there is a slight gap between the floor plate 4 and the floor plate 10, and between the adjacent flanges of the bars 3 and 8.

Figure 2:
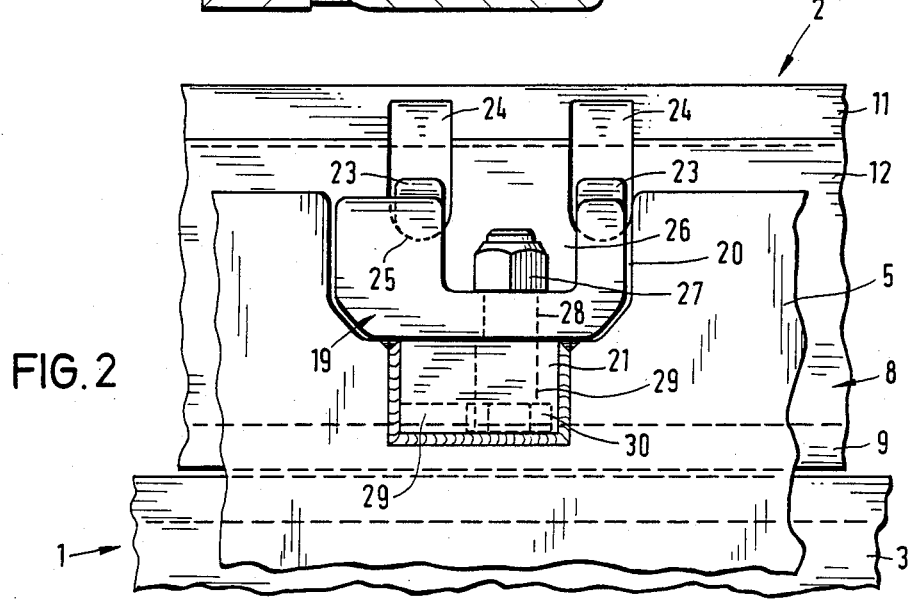
FIG. 2 is a partial view looking in the direction of the arrow II of FIG. 1.
Figure 3:
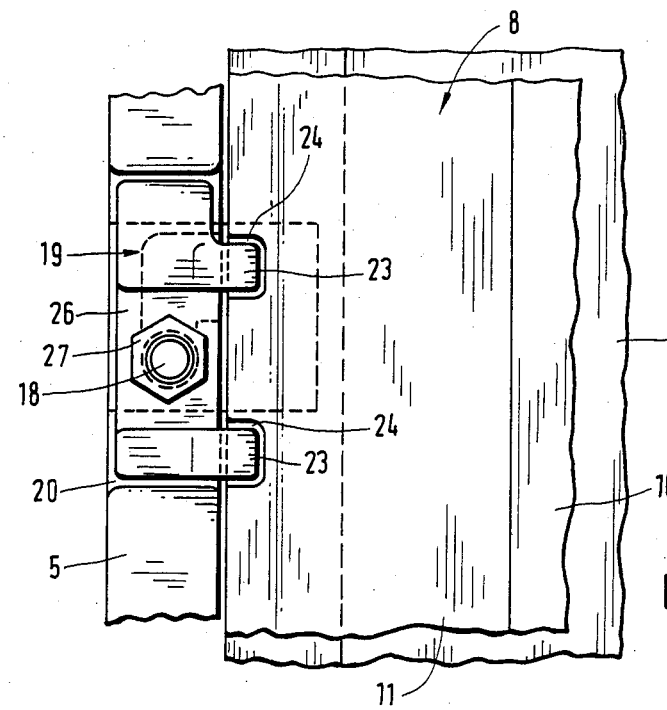
FIG. 3 is a plan view looking in the direction of the arrow III of FIG. 1.

The conveyor trough 2 is firmly fixed to the return trough 1, on both sides of the channel section, by means of vertical bolts 18 and releasable clamping members 19. The support bars 5 have recesses 20 in their upper regions for the reception of the clamping members 19. As shown in FIG. 2, the clamping members 19 each have an outline which conforms to the inner form of the recesses 20, so that they substantially fill the recesses. Insert pieces 21 are welded to the support bars 5 at the bases of the recesses 20, the insert pieces extending into the recesses 14, and defining pockets 22 for receiving the heads 30 of the bolts 18. In use, the clamping members 19 bear against the insert pieces 21.

Each of the clamping members 19 has two claws 23 in the upper region thereof, the claws engaging in vertical grooves 24 provided in the upper vertical web part 12 of the associated bar 8. The grooves 24, which are milled recesses in the bars 8, are open at the top. The base of each groove 24 forms a clamping face 25, against which the associated claw 23 acts. Between the two claws 23, each clamping member 19 is shaped to define a laterally and upwardly open inner pocket 26 for the reception of the threaded end of the associated bolt 18 and for a nut 27 screwed thereon. Each of the bolts 18 engages through a bore 28 in the associated clamping member 19.

Figure 4:
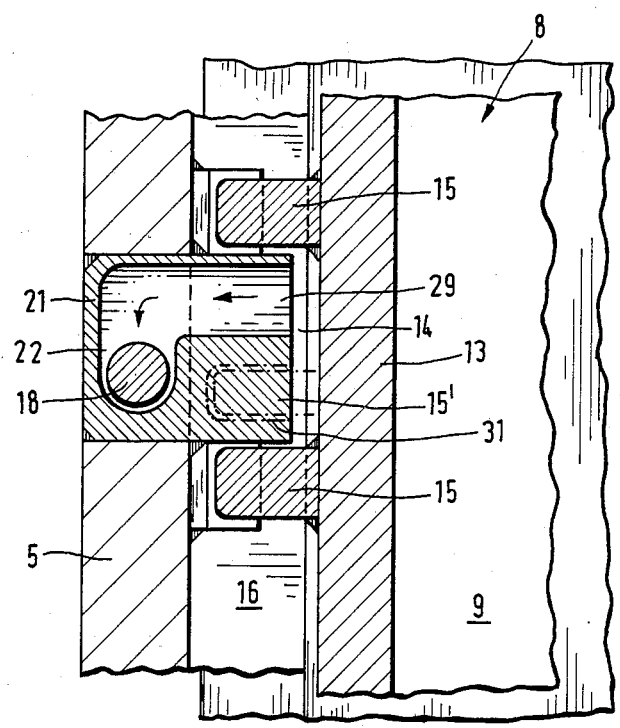
FIG. 4 is a horizontal partial section taken on the line IV—IV of FIG. 1.

As shown in FIG. 4, each of the insert pieces 21 has a generally L-shaped lead-in aperture 29 which extends from the bolt pocket 22 to the inner side of that insert piece, that is to say in the direction towards the adjacent bar 8 of the conveyor trough 2. Thus, it is possible with the conveyor trough 2 removed, to introduce the bolts 18, as indicated by the arrows in FIG. 4, from the inside, in via the lead-in apertures 29 into the bolt pockets 22. Then, with the conveyor trough 2 in position, the clamping members 19 are fitted on to the bolts 18 and the nuts 27 are screwed on, thereby clamping the claws 23 of the clamping members firmly against the clamping faces 25 of the bars 8. The bearing pieces 15 are simultaneously braced against the support faces 16 of the support bars 5, whereby the conveyor trough 2 is made fast to the return trough 1. It can be seen that the clamping forces are transmitted from the claws 23 to the support bars 5 by the shortest way, that is to say by way of the vertical web parts 12 and the bearing pieces 15 situated therebeneath. The support faces 16 lie beneath the inclined web parts 13 of the bars 8, which is advantageous for the direct transmission of the clamping forces.

As shown best in FIG. 4, two bearing pieces 15 can be arranged at every connection point, the bearing pieces being spaced apart sufficiently so as to receive the associated insert piece 21 therebetween. Accordingly, the bearing pieces 15 also serve for aligning the conveyor trough 2 in the longitudinal direction on the return trough 1. Alternatively, instead of using two bearing pieces 15, a single bearing piece 15' (shown in dot-and-dash lines at 15' in FIG. 4) could be provided at each connection point. Each bearing piece 15' would engage in a correspondingly-shaped slot 31 in the associated insert piece 21, and thus effects the alignment of the conveyor trough 2 on the return trough 1.

The bearing pieces 15 have flat lower support faces 32 which bear against the support faces 16 of the support bars 5. As shown in FIG. 1, each of the bearing pieces 15 has a sliding face 33 rising arcuately from its support face 32. These sliding faces 33 facilitate the fitting and dismantlement of the conveyor trough 2. Thus, during dismantlement, it is only necessary to unscrew the nuts 27 from the bolts 18, and to remove the clamping members 19 on one side of the channel section, to permit the conveyor trough 2 to be pivoted about the arcuate sliding faces 33 of the bearing pieces 15 on the opposite side of the channel section. This pivoting movement results in a release of the claws 23 of the clamping members 19 situated at this opposite side. If necessary, the nuts 27 can be slackened a little on this side of the channel section to facilitate this action. Complete release of the bolts 18 and removal of the clamping members 19 is not, however, necessary at this opposite side. In order to fit the conveyor trough 2 into position, the reverse procedure is followed. In other words, the conveyor trough 2 is inserted from that channel section side where the clamping members 19 have been removed, and, on the opposite side, is pivoted about the bearing pieces 15 into the locking position.

FIG. 1 shows that the lower support faces 32 of the bearing pieces 15, and also the support faces 16 of the support bars 5, are upwardly offset in relation to the under side 34 of the floor plate 10. The support positions formed by the faces 32 and 16, therefore, lie relatively high, which facilitates the fitting and dismantlement of the conveyor trough 2.

Figure 5:
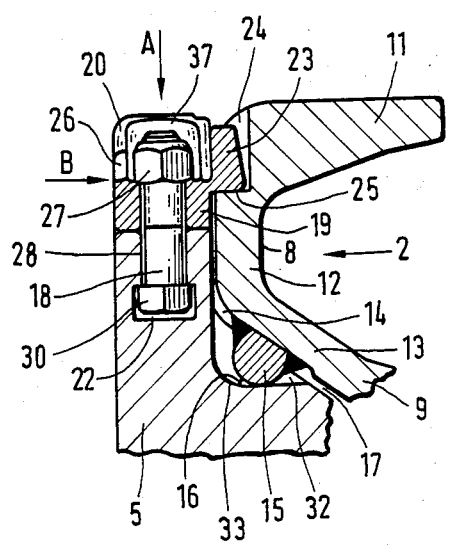
FIG. 5 is a sectional end view of the second form of conveyor channel section.
Figure 6:
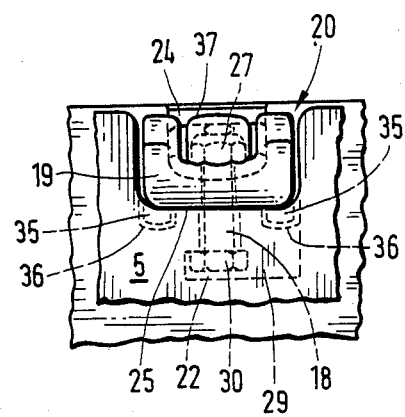
FIG. 6 shows the embodiment of FIG. 5 in a view corresponding to FIG. 2.
Figure 7:
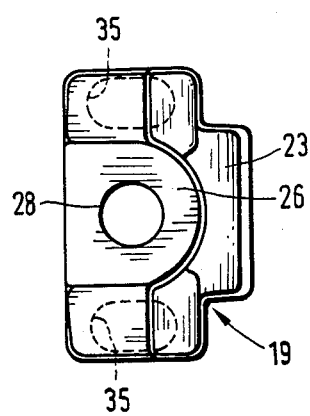
FIG. 7 is a plan view looking in the direction of the arrow A of FIG. 5.
Figure 8:
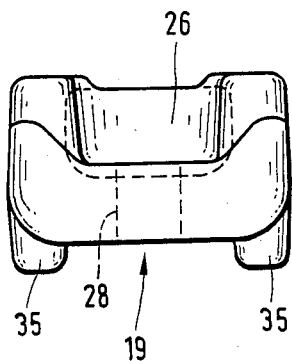
FIG. 8 is a view looking in the direction of the arrow B of FIG. 5.

The second form of conveyor channel section shown in FIGS. 5 to 8 is very similar to the first form of conveyor channel section. Accordingly, like reference numerals are used for like parts, and only the modified parts of the embodiment of FIGS. 5 to 8 will be described. Thus, in this embodiment, each clamping member 19 is provided with a single, relatively-wide claw 23, instead of with two narrow claws as provided according to FIGS. 1 to 4. The single claw 23 engages in a correspondingly wide groove 24 formed in the bar 8 of the conveyor trough 2. On the under side, the clamping member 19 has two alignment extension pieces 35 which engage in corresponding depressions 36 of the associated recess 20 of the support bar 5. These extension pieces 35 thus hold the clamping member 19 in its predetermined position during assembly. As shown in FIGS. 5 and 6, the nuts 27 of the bolts 18 can be covered by protective caps 37, in order to protect the screw connection against corrosion and the ingress of dust.

We claim:

1. A scraper-chain conveyor channel section comprising a return trough constituted by a pair of side walls interconnected by a floor plate, a respective support bar fixed to each of the side walls of the return trough, the support bars having portions extending upwardly beyond the side walls of the return trough, a conveyor trough arranged between the upwardly-extending portions of the support bars, the conveyor trough being constituted by a pair of side walls interconnected by a floor plate, and respective connection means for connecting the conveyor trough to each of the support bars, each of the connection means including a plurality of connectors and a plurality of clamping members, each of the connectors being seated in a respective pocket in the associated support bar and being engageable with a respective clamping member to force the clamping member into engagement with a respective clamping face on the conveyor trough, wherein the clamping members are provided with claws which engage in grooves formed in the side walls of the conveyor trough, the bases of the grooves defining the clamping faces.

2. A channel section according to claim 1, wherein the grooves are milled recesses formed in the side walls of the conveyor trough.

3. A channel section according to claim 1, wherein the grooves are open towards the upper sides of the side walls of the conveyor trough.

4. A channel section according to claim 1, wherein each clamping member has two claws.

5. A channel section according to claim1, wherein each clamping member has a single claw.

6. A channel section according to claim 1, wherein the pockets are formed in insert pieces which are welded into recesses in the support bars, the insert pieces supporting the clamping members.

7. A channel section according to claim 1, wherein each support bar is formed with a support face arranged beneath the associated side wall of the conveyor trough, whereby the side walls of the conveyor can be braced against said support faces with the aid of the connectors and the clamping members.

8. A channel section according to claim 1, wherein each of the connectors comprises a nut and bolt, the bolts being seated in pockets in the support bars and passing through apertures in the clamping members, and the nuts being engageable with the bolts to force the clamping members into engagement with the clamping faces.

9. A channel section according to claim 8, wherein the nuts are covered by protective caps.

10. A channel section according to claim 8, wherein each clamping member is formed with a laterally and upwardly open recess for receiving the nuts of the associated connector.

11. A channel section according to claim 8, wherein each pocket has an L-shaped lead-in aperture for directing the associated bolt into its seated position, said aperture being open towards the inner side of the associated support bar.

12. A channel section according to claim 1. wherein each clamping member is seated in a recess formed in the associated support bar.

13. A channel section according to claim 12, wherein each of said recesses is shaped to conform with the outline form of the associated clamping member.

14. A channel section according to claim 12, wherein the underneath of each clamping member includes alignment extension members which engage in correspondingly-shaped depressions formed in said recesses.

15. A scraper-chain conveyor channel section comprising a return trough constituted by a pair of side walls interconnected by a floor plate, a respective support bar fixed to each of the side walls of the return trough, the support bars having portions extending upwardly beyond the side walls of the return trough, a conveyor trough arranged between the upwardly-extending portions of the support bars, the conveyor trough being constituted by a pair of side walls interconnected by a floor plate, and respective connection means for connecting the conveyor trough to each of the support bars, each of the connection means including a plurality of connectors and a plurality of clamping members, each of the connectors being seated in a respective pocket in the associated support bar and being engageable with a respective clamping member to force that clamping member into engagement with a respective clamping face on the conveyor trough, wherein each clamping member is seated in a recess formed in the associated support bar and each of said recesses is shaped to conform with the outline form of the associated clamping member.

16. A channel section according to claim 15, wherein the clamping members are provided with claws which engage in grooves formed in the side walls of the conveyor trough, the bases of the grooves defining the clamping faces.

17. A scraper-chain conveyor channel section comprising a return trough constituted by a pair of side walls interconnected by a floor plate, a respective support bar fixed to each of the side walls of the return trough, the support bars having portions extending upwardly beyond the side walls of the return trough, a conveyor trough arranged between the upwardly-extending portions of the support bars, the conveyor trough being constituted by a pair of side walls interconnected by a floor plate, and respective connection means for connecting the conveyor trough to each of the support bars, each of the connection means including a plurality of connectors and a plurality of clamping members, each of the connectors being seated in a respective pocket in the associated support bar and being engageable with a respective clamping member to force that clamping member into engagement with a respective clamping face on the conveyor trough, wherein each clamping member is seated in a recess formed in the associated support bar and the underneath of each clamping member includes alignment extension members engaged in correspondingly-shaped depressions formed in said recesses.

18. A scraper-chain conveyor channel section comprising a return trough constituted by a pair of side walls interconnected by a floor plate, a respective support bar fixed to each of the side walls of the return trough, the support bars having portions extending upwardly beyond the side walls of the return trough, a conveyor trough arranged between the upwardly-extending portions of the support bars, the conveyor trough being constituted by a pair of side walls interconnected by a floor plate, and respective connection means for connecting the conveyor trough to each of the support bars, each of the connection means including a plurality of connectors and a plurality of clamping members, each of the connectors being seated in a respective pocket in the associated support bar and being engageable with a respective clamping member to force that clamping member into engagement with a respective clamping face on the conveyor trough, wherein each support bar is formed with a support face arranged beneath the associated side wall of the conveyor trough, whereby the side walls of the conveyor can be braced against said support faces with the aid of the connectors and the clamping members.

19. A channel section according to claim 18, wherein each side wall of the conveyor trough includes a web portion which is inwardly inclined towards the floor plate of the conveyor trough, the web portions defining hollows in the side walls of the conveyor trough, and wherein bearing pieces are fixed to said web portions, the bearing pieces supporting the conveyor trough on the support faces of the support bars.

20. A channel section according to claim 19, wherein the bearing pieces are welded to said web portions.

21. A channel section according to claim 19, wherein the bearing pieces support the conveyor trough on the support faces of the support bars with a clearance between the side walls and the floor plates of the return trough and of the conveyor trough.

22. A scraper-chain conveyor channel section comprising a return trough having a pair of side walls interconnected by a floor plate, a respective support bar fixed to each of the side walls of the return trough, the support bars having portions extending upwardly beyond the side walls of the return trough, a conveyor trough arranged between the upwardly-extending portions of the support bars and supported on support faces of the support bars, the conveyor trough having a pair of side walls interconnected by a floor plate, and respective connection means for connecting the conveyor trough to each of the support bars, each side wall of the conveyor trough including a web portion which is inclined towards, and fixed to, the floor plate of the conveyor trough, the web portions defining hollows in the side walls of the conveyor trough, wherein bearing pieces are fixed to the web portions within the hollows, the bearing pieces supporting the conveyor trough on the support faces of the support bars with a clearance between the side walls and the floor plates of the return trough and of the conveyor trough.

23. A channel section according to claim 23, wherein the bearing pieces comprise alignment means for aligning the conveyor trough in the longitudinal direction on the return trough.

24. A channel section according to claim 23, wherein the support bars engage in the hollows in the side walls of the conveyor trough, the support bars being provided with alignment stops for the bearing pieces.

25. A channel section according to claim 23, wherein each bearing piece is provided with sliding faces rising arcuately from the face thereof which rests on the support face of the associated support bar.

26. A channel section according to claim 23, wherein the support face of each support bar is offset upwards in relation to the underneath side of the floor plate of the conveyor trough.

* * * * *